United States Patent
Shirani-Mehr et al.

(10) Patent No.: US 8,768,393 B2
(45) Date of Patent: Jul. 1, 2014

(54) METHOD AND APPARATUS FOR INTERFERENCE MITIGATION IN WIRELESS SYSTEMS

(75) Inventors: Hooman Shirani-Mehr, Hillsboro, OR (US); Yang-Seok Choi, Portland, OR (US); Hujun Yin, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 316 days.

(21) Appl. No.: 13/174,392

(22) Filed: Jun. 30, 2011

(65) Prior Publication Data

US 2013/0005376 A1 Jan. 3, 2013

(51) Int. Cl.
*H04B 7/00* (2006.01)

(52) U.S. Cl.
USPC ...... 455/509; 455/63.1; 455/63.2; 455/67.11; 455/67.13; 455/68; 455/69; 455/450; 455/451; 455/452.1; 455/452.2; 455/501; 455/525; 455/526; 370/252; 370/328; 370/329; 370/330; 370/335; 370/342; 370/441

(58) Field of Classification Search
USPC ............. 455/63.1, 63.2, 67.11, 67.13, 68, 69, 455/450, 451, 452.1, 452.2, 501, 525, 526, 455/509; 370/252, 328, 329, 330, 335, 342, 370/441
See application file for complete search history.

(56) References Cited

U.S. PATENT DOCUMENTS

| | | | | |
|---|---|---|---|---|
| 7,944,906 B2* | 5/2011 | Xu et al. | ...... | 370/349 |
| 8,145,223 B2* | 3/2012 | Guey | ...... | 455/447 |
| 8,305,987 B2* | 11/2012 | Fong et al. | ...... | 370/329 |
| 8,520,616 B2* | 8/2013 | Cui et al. | ...... | 370/329 |
| 8,559,961 B2* | 10/2013 | Boudreau et al. | ...... | 455/447 |
| 2008/0013610 A1* | 1/2008 | Varadarajan et al. | ...... | 375/221 |
| 2009/0181708 A1* | 7/2009 | Kim et al. | ...... | 455/501 |
| 2010/0239036 A1 | 9/2010 | Koo et al. | | |
| 2010/0261493 A1* | 10/2010 | Guey et al. | ...... | 455/501 |
| 2010/0272218 A1 | 10/2010 | Yeh et al. | | |
| 2010/0291936 A1* | 11/2010 | Zangi et al. | ...... | 455/450 |
| 2010/0322176 A1* | 12/2010 | Chen et al. | ...... | 370/329 |
| 2011/0009065 A1* | 1/2011 | Carter | ...... | 455/63.1 |
| 2011/0081865 A1 | 4/2011 | Xiao et al. | | |
| 2011/0103339 A1 | 5/2011 | Kim et al. | | |
| 2011/0134978 A1* | 6/2011 | Au-Yeung et al. | ...... | 375/224 |
| 2011/0230224 A1* | 9/2011 | Larsson et al. | ...... | 455/513 |

FOREIGN PATENT DOCUMENTS

| | | |
|---|---|---|
| WO | 2011/020062 A2 | 2/2011 |
| WO | 2013/003617 A2 | 1/2013 |
| WO | 2013/003617 A3 | 4/2013 |

OTHER PUBLICATIONS

International Search Report and Written Opinion Received for PCT Application No. PCT/US2012/044688 Mailed on Feb. 1, 2013, 11 pages.
International Preliminary Report on Patentability received for PCT Patent Application No. PCT/US2012/044688, mailed on Jan. 16, 2014, 7 Pages.

* cited by examiner

*Primary Examiner* — Olumide T Ajibade Akona
(74) *Attorney, Agent, or Firm* — Carrie A. Boone, P.C.

(57) ABSTRACT

A method is disclosed to eliminate inter-cluster interference of user equipment located at the edge of a cluster of cells. The method operates by employing fractional frequency reuse (FFR) principles on clusters or combinations of cells in a wireless neighborhood, in which base stations in the cells coordinate their operations in a scheme known as coordinated multi-point transmission (CoMP). By using the FFR principles to single out edge users of the CoMP cluster, the method mitigates interference and increases throughput for the edge users.

18 Claims, 11 Drawing Sheets

METHOD AND APPARATUS FOR INTERFERENCE MITIGATION IN WIRELESS SYSTEMS

TECHNICAL FIELD

This application relates to coordinated multi-point transmission (CoMP) and, more particularly, to a method to mitigate interference for user equipment having CoMP capability.

BACKGROUND

Figure 1:
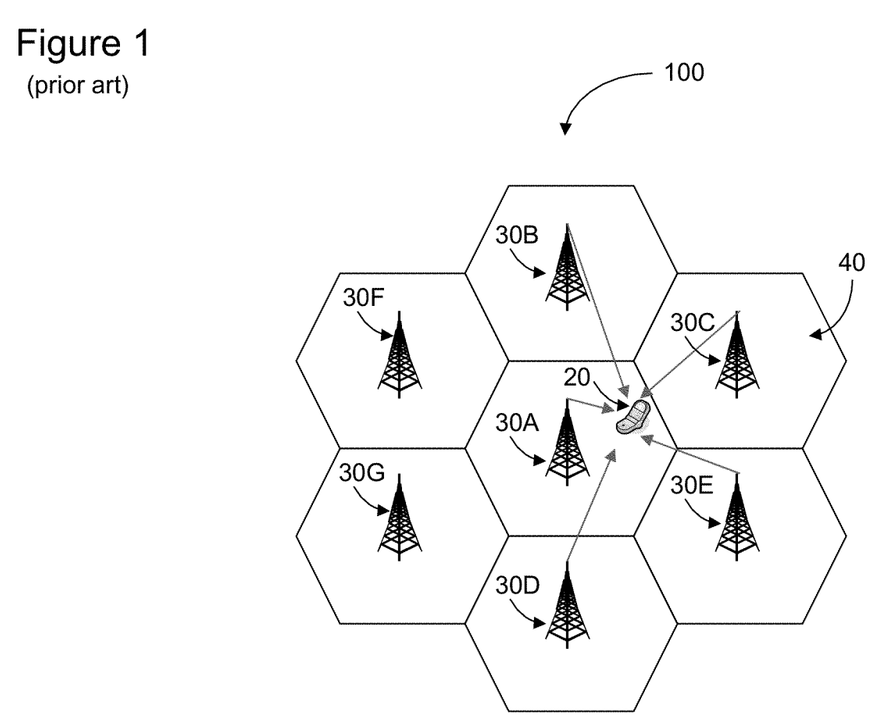
FIG. 1 is a diagram of a wireless neighborhood having cellular regions and base stations serving user equipment, according to the prior art.

In conventional multi-cell systems, users at the cell edge suffer from high inter-cell interference and are not able to achieve high throughputs because of their low signal-to-interference plus noise ratio. FIG. 1 shows a wireless neighborhood 100 having multiple cellular regions or cells 40, each cellular region being serviced by a base station 30. Base stations 30A-30G occupy the wireless neighborhood 100 (collectively, base stations 30). A mobile device or other user equipment (UE) 20 moving through the wireless neighborhood 100 is occasionally located at the edge of a cellular region 40. Although the UE 20 is serviced by the base station 30A, when at the edge of the center cellular region 40, the UE 20 may experience interference from base stations located in several of the surrounding cellular regions, namely, from base stations 30B, 30C, 30D, and 30E.

User equipment located at the edge of the cell 40 thus may experience high inter-cell interference, which, in turn, causes low throughputs because of a low signal-to-interference plus noise ratio (SINR).

Thus, there is a continuing need for a method to overcome the shortcomings of the prior art.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a method is disclosed to eliminate inter-cluster interference of user equipment located at the edge of a cluster of cells. The method operates by employing fractional frequency reuse (FFR) principles on clusters or combinations of cells in a wireless neighborhood, in which base stations in the cells coordinate their operations in a scheme known as coordinated multi-point transmission (CoMP). By using the FFR principles to single out edge users of the cluster, the method mitigates interference and increases throughput for the edge users. This new scheme may be considered as an extension of conventional FFR to the cluster level.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. The following detailed description is, therefore, not to be construed in a limiting sense, as the scope of the subject matter is defined by the claims.

Figure 2:
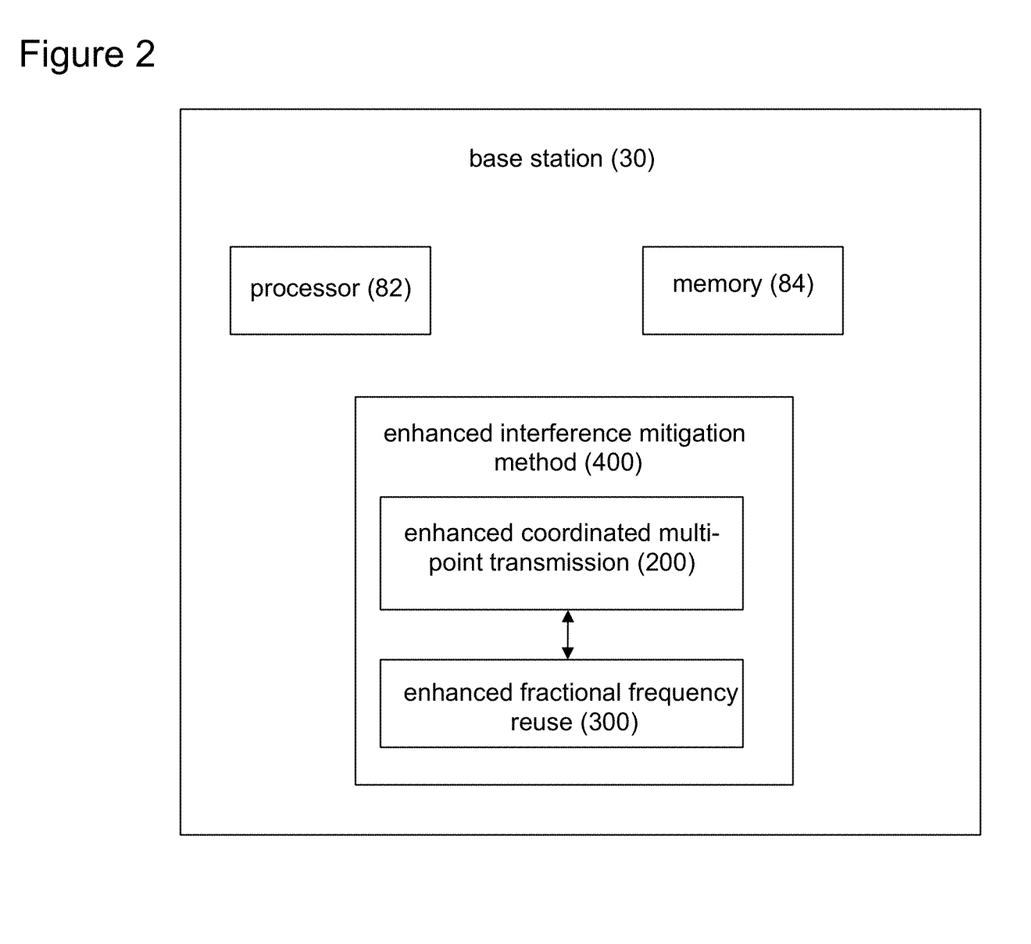
FIG. 2 is a block diagram of an enhanced base station that employs an enhanced interference mitigation method, including enhanced coordinated multi-point transmission and enhanced fractional frequency reuse, according to some embodiments.

FIG. 2 is a block diagram of a base station 30 employing the enhanced interference mitigation method 400, according to some embodiments. The base station 30 is equipped, at a minimum, with a processor 82 and a memory 84, such that the enhanced interference mitigation method 400 may be executed thereon. The enhanced interference mitigation method 400 enhances and combines two known principles, coordinated multi-point transmission and fractional frequency reuse, in a novel manner, to mitigate interference for user equipment located at the edge of a cluster. To illustrate the enhanced interference mitigation method 400, the principles of enhanced coordinated multi-point transmission 200 and enhanced fractional frequency reuse 300, as well as how those techniques are combined, are described in more detail below. In some embodiments, the enhanced interference mitigation method 400 is a software program that is loaded into the memory 84 of the base station 30 and executed by the processor 82 thereon. In other embodiments, the enhanced interference mitigation method 400 is a combination of software and hardware components, in which the software portion is executed by the processor 82.

The wireless neighborhood 100 of FIG. 1, introduced in the background section, illustrates the principle of inter-cell interference, in which the user equipment 20 experiences interference from base stations outside the relevant cell, that is, base stations that are not the user equipment's home base station. To remove inter-cell interference and increase the capacity of the network, network multiple-input-multiple-output (MIMO), also known as coordinated multi-point transmission (CoMP), has been recently proposed. Under CoMP, a limited number of neighboring cells form a cluster (CoMP set), and the base stations in the newly formed cluster perform joint coordination or pre-coding to serve users in the cluster by exchanging information through a backhaul.

Figure 3:
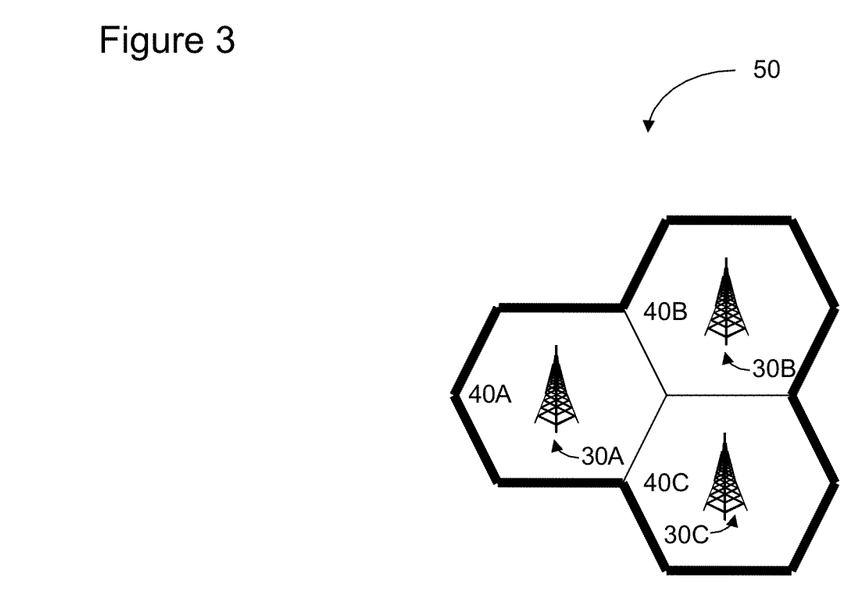
FIG. 3 is a diagram of a cluster formed from three cells, where the cluster is used by the enhanced interference mitigation method of FIG. 2, according to some embodiments.

FIG. 3 is a block diagram of a cluster or CoMP set 50, according to some embodiments. The cluster 50 consists of three cells 40A, 40B, and 40C, with supporting enhanced node base stations (eNBs) 30A, 30B, and 30C, respectively. As used herein, an enhanced node base station is a base station that supports CoMP. According to CoMP, user equipment 20 (e.g., the mobile device) entering into the cluster 50, will be serviced by joint coordination of each of the base stations 30A, 30B, and 30C. Although the user equipment 20 is jointly serviced by the three eNBs, one of the eNBs remains the designated "home" base station. The home eNB is generally the base station that is closest to the user equipment (e.g., the one having the lowest path loss from the user equipment).

By using CoMP, interference for the users in the interior of the cluster 50 may be completely removed. However, just as with the cells 40 in the previous example (FIG. 1), users on the edge of the cluster 50 are likely to experience interference caused by one or more base stations in the neighboring clusters (inter-cluster interference).

Figure 4:
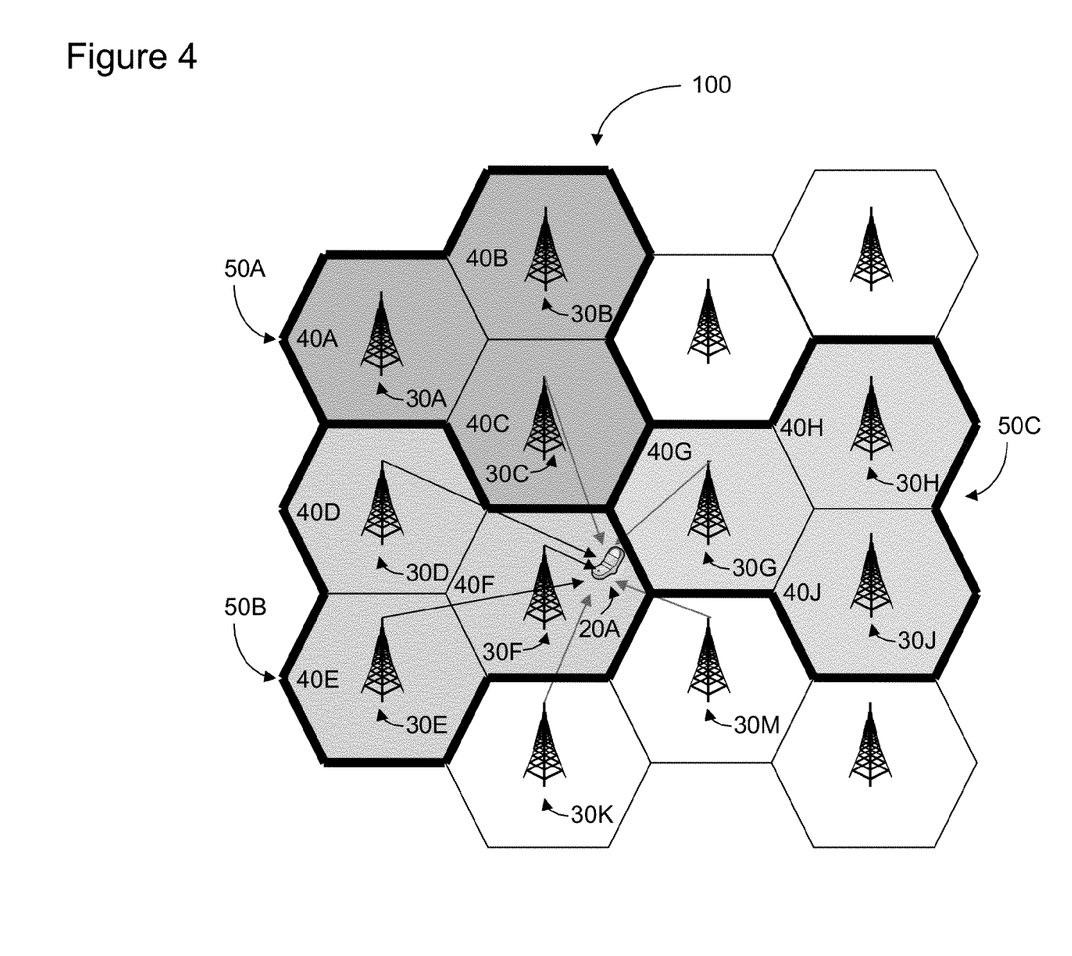
FIG. 4 is a diagram of a wireless neighborhood having multiple clusters used to illustrate inter-cluster interference which is mitigated by the enhanced interference mitigation method of FIG. 2, according to some embodiments.

This is illustrated in the wireless neighborhood 100 of FIG. 4, in which neighboring cells 40 form clusters 50 of size three. Three neighboring cells 40A, 40B, and 40C form cluster 50A (blue), neighboring cells 40D, 40E, and 40F form cluster 50B (rose), and neighboring cells 40G, 40H, and 40J form cluster 50C (lilac). The UE 20 is located at the edge of the cluster 50B. The eNBs 30D, 30E, and 30F in the cluster 50B cooperate and transmit a useful signal to the UE 20 (black arrows) while the eNBs 30C, 30G, 30K, and 30M in the neighboring clusters transmit interfering signals to the UE 20 (red arrows) and are thus likely to cause inter-cluster interference to the mobile device.

Under enhanced CoMP 200, the UE 20 estimates its channel direction to different eNBs by measuring reference signals 90 transmitted from different eNBs in the cluster 50 and feeds back the measured information to its "home" eNB by using the appropriate pre-coding matrix indicator (PMI). Moreover, the UE 20 measures the channel quality from different eNBs by estimating the SINR and reports the appropriate CQI to its "home" eNB.

Figure 5:
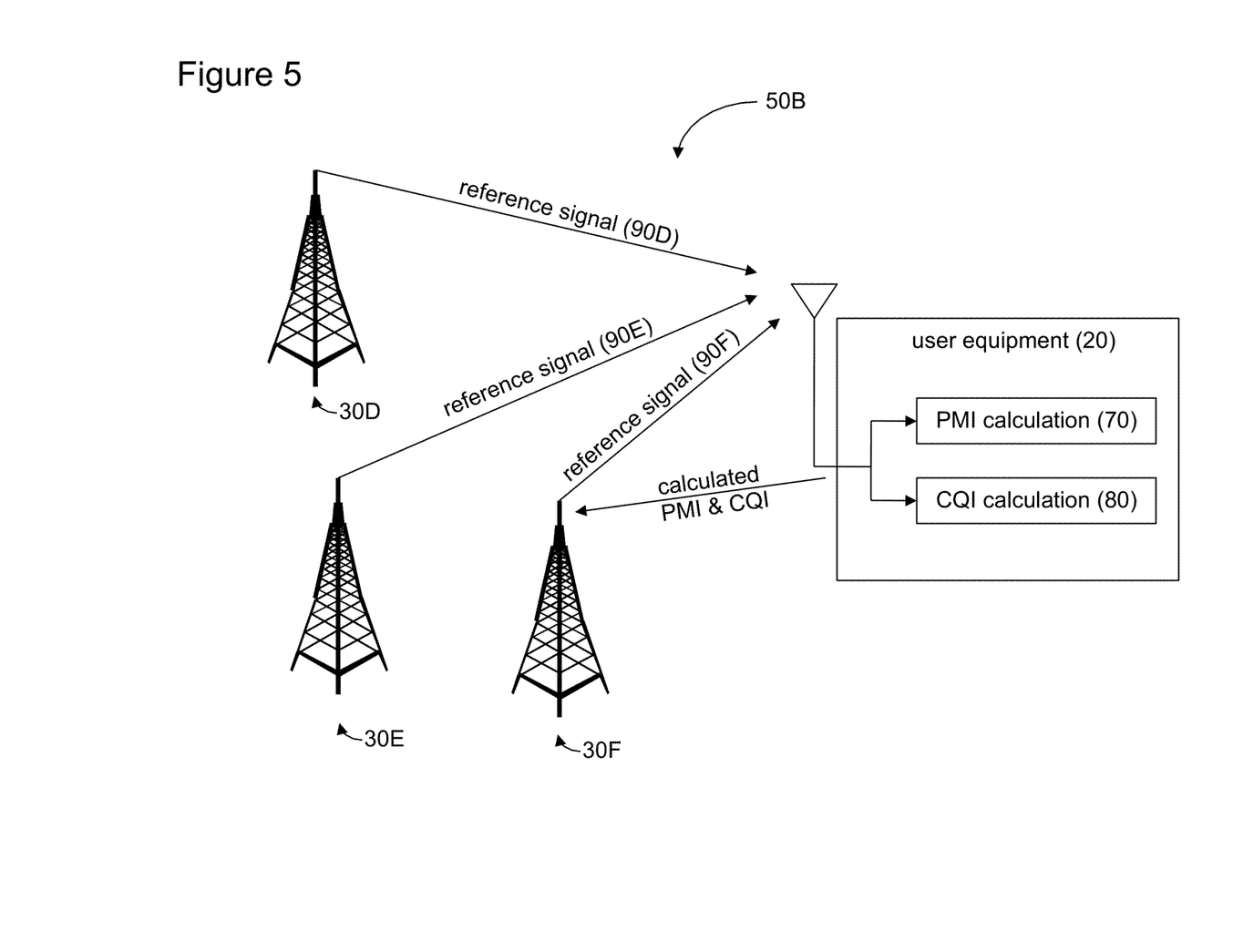
FIG. 5 is a diagram of the enhanced coordinated multi-point transmission used by the enhanced interference mitigation method of FIG. 2, according to some embodiments.

The enhanced CoMP operations 200 are illustrated in FIG. 5, according to some embodiments. Using cluster 50B from FIG. 4 as an example, the UE 20 receives reference signals 90D, 90E, and 90F from eNBs 30D, 30E, and 30F, respectively. The UE 20 uses these reference signals to estimate its channel direction to different eNBs, then sends the measured information to the home eNB using the PMI, shown in FIG. 5 as PMI calculation 70. Further, the UE 20 measures the channel quality from these same eNBs 30D, 30E, 30F, and sends the measured CQI to the home eNB, shown in FIG. 5 as CQI calculation 80. In the example of FIG. 5, the eNB 30F is the home eNB.

In addition, in some embodiments, each UE 20 decides the actual size of its cooperation based on calculating the path losses from the eNBs 30 in the cluster 50 to the UE 20, and comparing them with a predefined threshold value. Therefore, the actual "cooperating eNBs" (e.g., the number of eNBs that are used to perform enhanced CoMP 200) may be less than the number of eNBs in the cluster. As an example, where path losses exceed the predefined threshold value for eNB 30D, eNB 30E and eNB 30F are the cooperating eNBs while eNB 30D does not participate in the enhanced CoMP operations 200.

Figure 6:
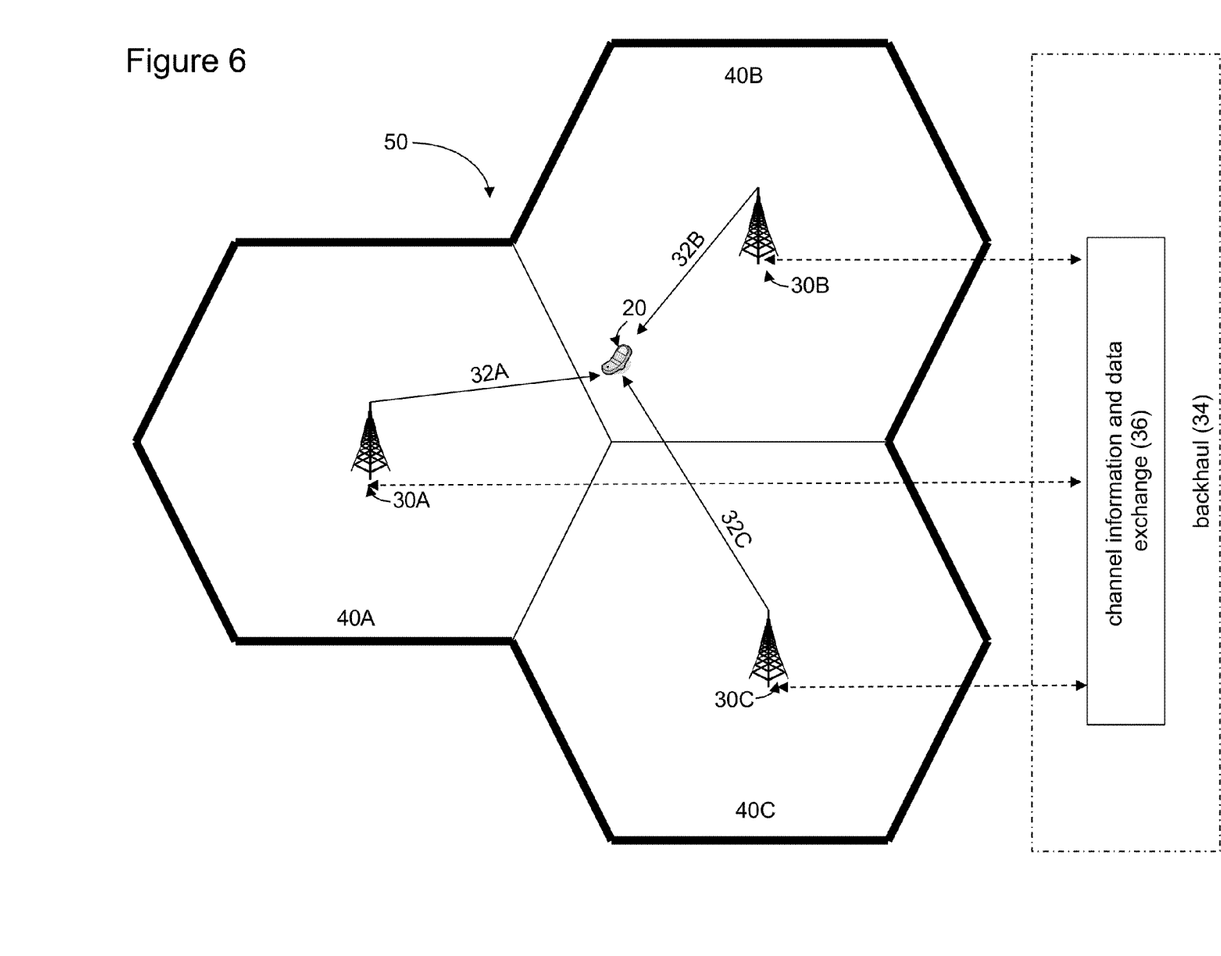
FIG. 6 is a diagram showing operations between the base stations and a backhaul used by the enhanced interference mitigation method of FIG. 2, according to some embodiments.

FIG. 6 shows an example where three eNBs 30A, 30B, 30C in a cluster 50 of having three cells 40A, 40B, 40C jointly transmit respective signals 32A, 32B, 32C to the UE 20. In some embodiments, all of the information associated with the signal transmission, shown as channel information and data exchange 36, is shared between all eNBs in the cluster 50 through a backhaul 34, to be used for joint signal transmission to the UE 20. The backhaul 34 is actually a link that connects the eNBs in a wireless neighborhood and is used to transfer data and channel information to the eNBs.

Figure 7:
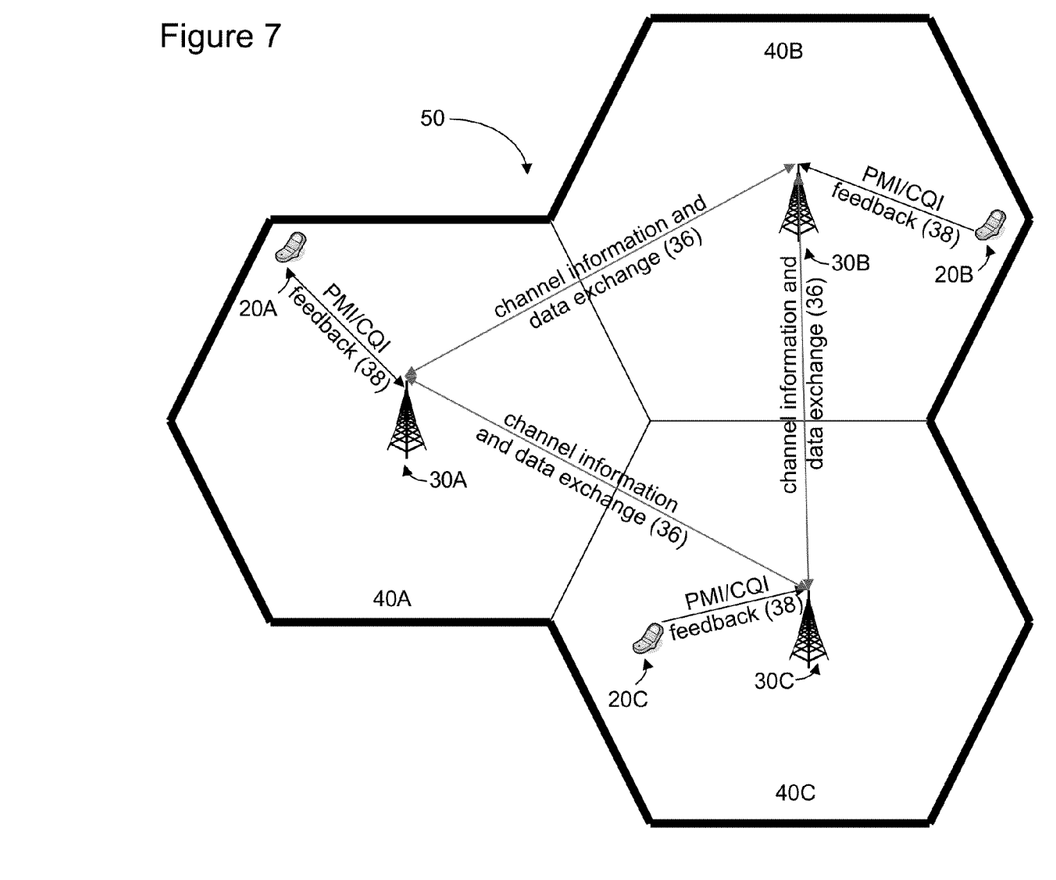
FIG. 7 is a diagram of a cluster employing coordinated multi-point transmission used by the enhanced interference mitigation method of FIG. 2, according to some embodiments.

FIG. 7 is a diagram of the cluster 50 having three cells 40A, 40B, 40C, each cell having a respective eNB 30A, 30B, and 30C and servicing a different UE 20A, 20B, 20C, according to some embodiments. Recall from FIG. 5 that the UE 20 measures the reference signals transmitted from different eNBs (which is how the UE estimates its channel direction to the eNBs), and then feeds this information back to its home eNB using the PMI (PMI calculation 70). The UE 20 also measures the channel quality from the different eNBs by estimating the SINR (CQI calculation 80), and reports this to the home eNB as well. FIG. 7 shows PMI/CQI feedback 38, the results of the PMI calculation 70 and the CQI calculation 80 being fed back by each UE 20A, 20B, 20C to its respective home eNB 30A, 30B, and 30C. Although FIG. 7 makes it appear as though the eNBs are communicating with one another directly, the channel information and data exchange 36 is fed between eNBs through the backhaul 34 (not shown). Channel information and data are shared among all eNBs of the cluster 50.

Figure 8:
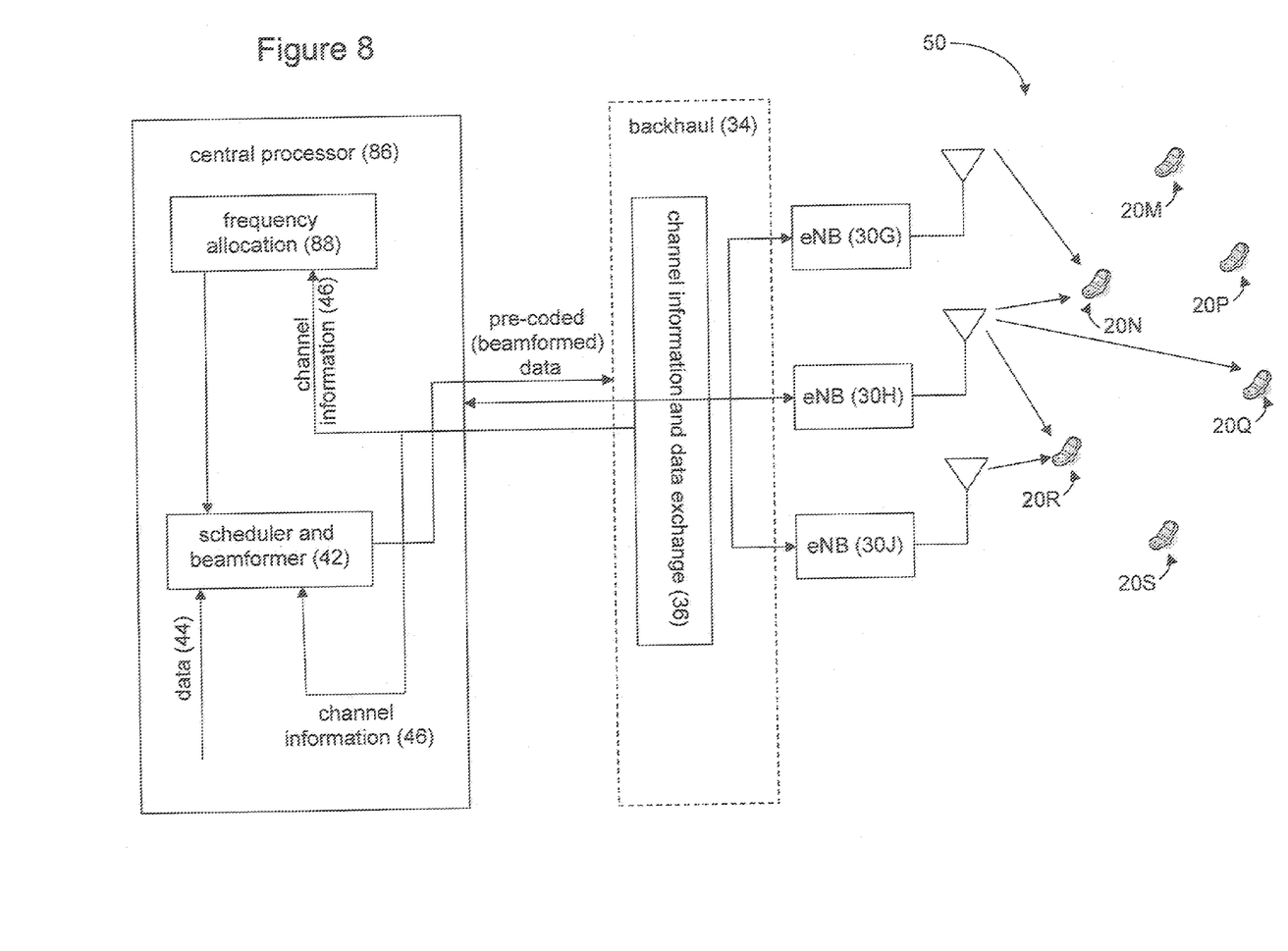
FIG. 8 is a diagram of the backhaul role in employing coordinated multi-point transmission used by the enhanced interference mitigation method of FIG. 2, according to some embodiments.

FIG. 8 provides a more detailed view of the backhaul 34 first introduced in FIG. 6, according to some embodiments. The cluster 50 includes three cells 40G, 40H, 40J, in which three respective eNBs 30G, 30H, and 30J reside, and six UEs 20M, 20N, 20P, 20Q, 20R, 20S, with each eNB communicating with the backhaul 34. After the eNBs collect the information, shown as channel information and data exchange 36, a scheduler and beamformer 42 in a central processor 86 connected to the backhaul 34 collects data 44 and channel information 46 and selects the UEs in the cluster 50 to be served. The scheduler and beamformer 42 further calculates the pre-coding matrices that will be used to cancel the interference between UEs in the cluster 50. In some embodiments, the scheduler and beamformer uses zero-forcing beamforming (ZFBF) to calculate the pre-coding matrices. Following this calculation, the appropriate signal is sent to each eNBs 30G, 30H, 30J, to be transmitted to the selected UEs. In FIG. 8, the UEs 20N, 20Q, and 20R are selected while UEs 20M, 20P, and 20S are not selected during this analysis.

Figure 9:
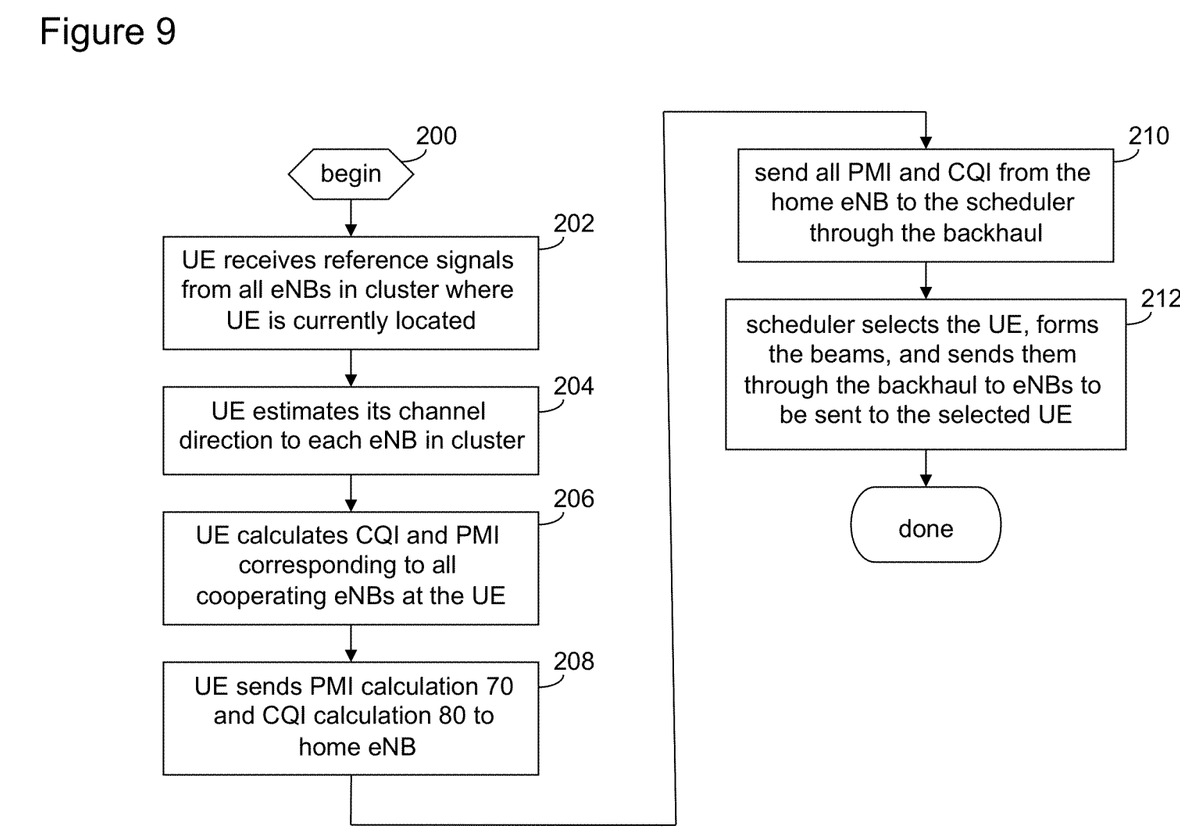
FIG. 9 is a flow diagram illustrating the enhanced coordinated multi-point transmission used by the enhanced interference mitigation method of FIG. 2, according to some embodiments.

FIG. 9 is a flow diagram summarizing the above-described enhanced CoMP operations 200, according to some embodiments. As depicted in FIG. 5, the UE receives the reference signals from the respective eNBs in the cluster 50 (block 202). From these reference signals, the UE is able to estimate its channel direction to each eNB in the cluster (block 204). The UE then calculates the CQI (CQI calculation 80) and PMI (PMI calculation 70) corresponding to all cooperating eNBs (block 206), where the number of cooperating eNBs may be less than all of the eNBs in the cluster. The calculated CQI 80 and PMI 70 are then sent to the home eNB (block 208), but are also received by the scheduler and beamformer 42 located in the central processor 86 (see FIG. 8) (block 210). Finally, the scheduler and beamformer 42 selects the UE, forms the beams for transmission to the UE, and sends them through the backhaul to the eNBs, where they are then sent to the UE (block 212).

Although by using enhanced CoMP 200, interference for the UEs in the interior of the cluster 50 may be removed entirely, the UEs on the edge of the clusters may be adversely affected by interference caused by eNBs in neighboring clusters, known herein as inter-cluster interference. So, like the inter-cell interference experienced by the UE 20 in FIG. 1, the UE 20A in FIG. 4 experiences inter-cluster interference when the cells 40 are organized for CoMP.

Figure 10:
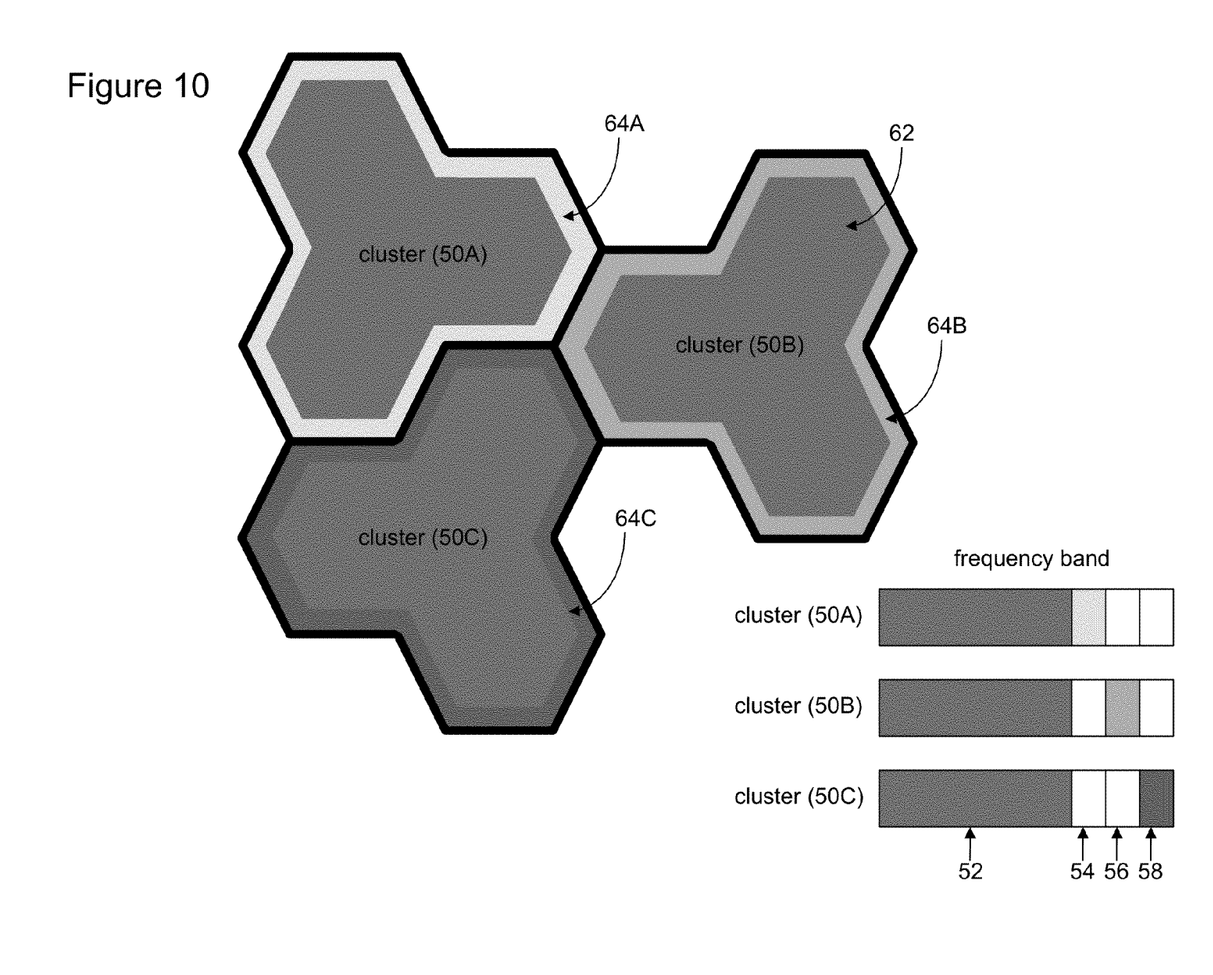
FIG. 10 is a diagram of a cluster that is partitioned for performing enhanced fractional frequency reuse by the enhanced interference mitigation method of FIG. 2, according to some embodiments.

To eliminate the inter-cluster interference, an inter-cluster interference mitigation (ICIM) method 400 is proposed, according to some embodiments. Under the ICIM method 400, enhanced fractional frequency reuse (FFR) 300 is used in conjunction with enhanced CoMP 200, as described above, to mitigate interference experienced by cluster edge UEs and to thereby increase the throughput of such cluster edge UEs. FIG. 10 is a diagram showing three clusters 50A, 50B, 50C in which base stations within each cluster employ enhanced CoMP 200, as described above, as well as enhanced FFR 300, to coordinate operations to/from UEs traveling through the respective clusters. Employing the principles of fractional frequency reuse to clusters, each cluster 50A, 50B, 50C is partitioned into a center region 62 (green) and an edge region, with cluster 50A having a yellow edge region 64A, cluster B having a blue edge region 64B, and cluster 50C having a red edge region 64C. The depiction in FIG. 10 merely represents that the clusters are partitioned into center regions and edge regions, and is not intended to reflect the relative amounts of each. Therefore, the edge regions may be larger (thicker) or smaller (thinner) than is depicted in FIG. 10.

Each cluster has a defined frequency band, also featured in FIG. 10, such that UEs disposed at the center region 62 of any of the clusters utilize the frequency range 52, while UEs disposed at the edge regions utilize smaller but dedicated regions of the frequency band. UEs at the edge region 64A (cluster 50A) utilize frequency range 54, UEs at the edge region 64B (cluster 50B) utilize frequency range 56, and UEs at the edge region 64C (cluster 50C) utilize frequency range 58. What the frequency band depiction in FIG. 10 illustrates is that UEs at the center of the cluster, which are not as likely to experience inter-cluster interference as edge UEs, are able to share the frequency band 52 shown in green. On the other hand, the edge-located UEs, which are more likely to experience inter-cluster interference, are supplied with a dedicated portion of the frequency band 54 (yellow), 56 (blue), or 58 (red) so as to mitigate such interference. The UE located in the edge region 64A of cluster 50A only shares the frequency band 54 with other UEs located in the same edge region 64A, but does not share the frequency band with a UEs located in the edge region 64B of cluster 50B, the latter UE instead using the frequency band 56. In this way, the edge UEs are likely to transmit to and receive from their respective eNBs without interference.

Figure 11:
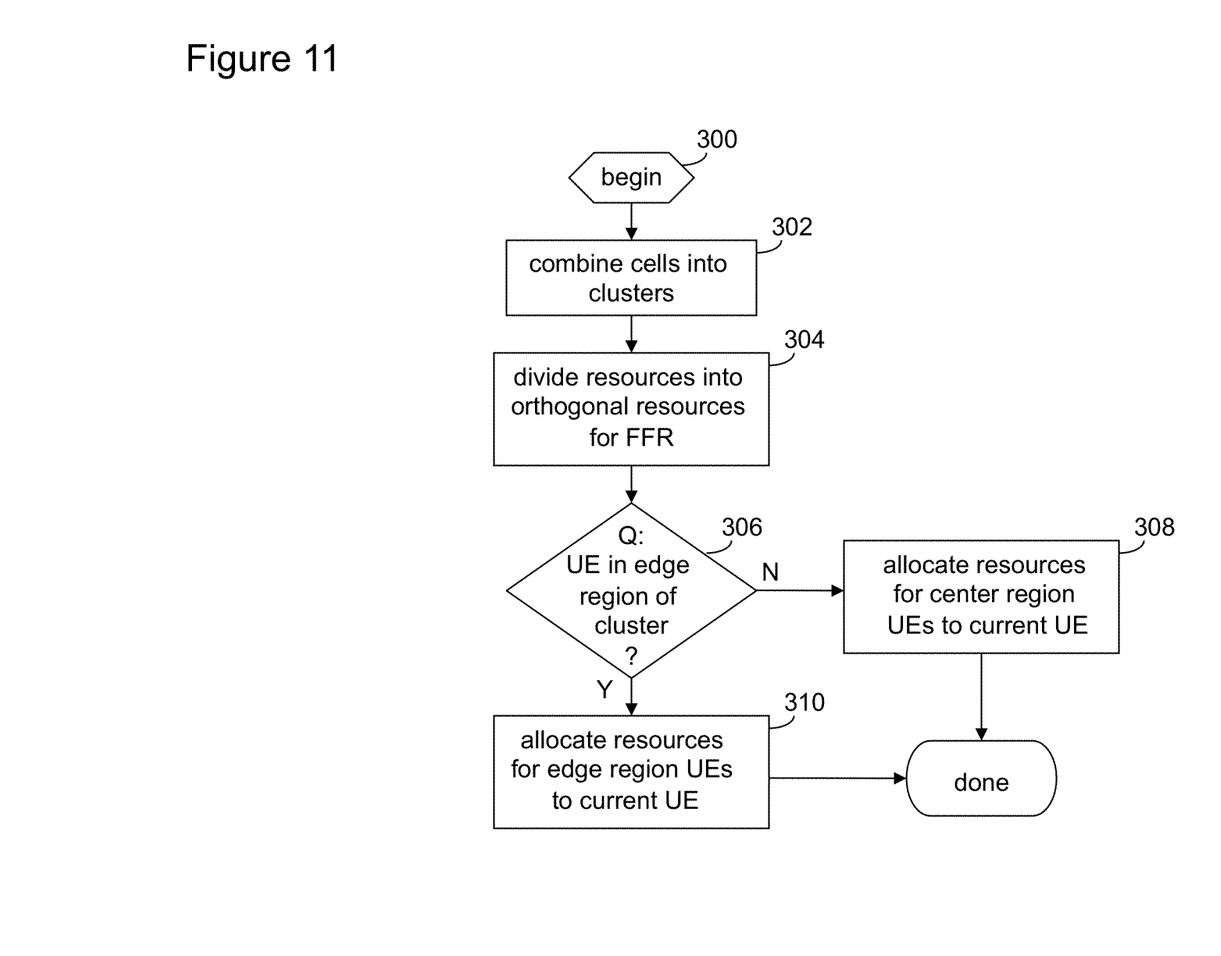
FIG. 11 is a flow diagram illustrating the enhanced fractional frequency reuse operations performed by the enhanced interference mitigation method of FIG. 2, according to some embodiments.

FIG. 11 is a flow diagram showing operations performed by the enhanced FFR 300 of the ICIM method 400 (FIG. 2), according to some embodiments. Initially, cells 40 are combined to form clusters 50 (block 302). In the examples herein, the clusters are of size three, with three cells making up the cluster, but the cluster size may be larger or smaller. The system resources, namely, the frequency band, are then divided into orthogonal resources suitable for performing FFR (block 304).

Next, the enhanced FFR 300 of the ICIM method 400 determines the location of the UE (block 306). If the UE is located in one of the edge regions 64A, 64B, or 64C (the "yes" prong of block 306), the enhanced FFR method 300 allocates resources for the edge region UEs, namely the frequency band 54, 56, or 58 (block 310). Otherwise, the UE is located in a center region of one of the clusters 50 and the enhanced FFR 300 allocates resources accordingly, namely, the frequency band 52 (block 308). In either circumstance, the enhanced FFR 300 serves the UE using the above-described enhanced CoMP 200 (FIG. 9), namely, by eNBs 30 residing in the cluster 50 coordinating their operations so as to serve the UE.

By combining enhanced CoMP 200 with enhanced FFR 300, the ICIM method 400 ensures that the interference will be eliminated (or significantly reduced) for all the users in a cluster. For users in the interior of the cluster, the interference is mitigated due to the enhanced CoMP 200, while for users at the edge of the cluster, the interference is mitigated due to the enhanced FFR 300. Furthermore, the total throughput of the system is improved, in some embodiments.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A method, comprising:
    employing enhanced coordinated multi-point transmission by a enhanced node base station (eNB) in a wireless neighborhood to coordinate wireless transmissions to and from a user equipment (UE) traveling through the wireless neighborhood, wherein cellular regions in the wireless neighborhood are combined to form clusters, each cluster comprising a plurality of cellular regions, each cellular region being occupied by one of a plurality of eNBs, the enhanced coordinated multi-point transmission further comprising:
        receiving, by the eNB, a plurality of path loss calculations, wherein the plurality of path loss calculations comprise path losses between the UE and the plurality of eNBs; and
        eliminating, by the eNB, one or more of the plurality of eNBs whose path loss exceeds a predefined threshold value, wherein the uneliminated eNBs of the plurality of eNBs comprise cooperating eNBs; and
    employing enhanced fractional frequency reuse by the eNB in the cluster to allocate a frequency band to be used for the wireless transmissions, wherein the cluster is divided into a center region and a plurality of edge regions, the plurality of edge regions substantially corresponding to the edges of the plurality of cellular regions making up the cluster.

2. The method of claim 1, further comprising:
    transmitting, by the eNB, a reference signal to the UE, wherein the reference signal enables the UE to estimate its channel direction.

3. The method of claim 2, further comprising:
    receiving, by the eNB, a channel quality indicator (CQI) and pre-coding matrix indicator (PMI) corresponding to each of the cooperating eNBs, wherein the CQI and PMI are calculated by the UE.

4. The method of claim 3, further comprising:
    sending, by the eNB, the calculated CQI and PMI to a scheduler, wherein the scheduler is part of a backhaul connection between the plurality of eNBs, including the cooperating eNBs.

5. The method of claim 4, further comprising:
receiving, by the eNB, one or more beams formed by the scheduler, the one or more beams being sent through the backhaul to the cooperating eNBs, wherein the one or more beams are used by the cooperating eNBs for transmissions to respective UEs.

6. The method of claim 1, employing enhanced fractional frequency reuse to allocate a frequency band to be used for the wireless transmissions further comprising:
determining, by the eNB, that the UE is located in the center region of the cluster; and
using, by the eNB, a first frequency band of the allocated frequency band for wireless transmissions to and from the UE.

7. The method of claim 1, employing enhanced fractional frequency reuse to allocate a frequency band to be used for the wireless transmissions further comprising:
determining, by the eNB, that the UE is located in the one of the plurality of edge regions of the cluster; and
using, by the eNB, one of a plurality of smaller frequency bands of the allocated frequency band for wireless transmissions to and from the UE.

8. A method, comprising:
employing enhanced coordinated multi-point transmission by a user equipment (UE) traveling through a wireless neighborhood to coordinate wireless transmissions to and from cooperating enhanced node base stations (eNBs) disposed throughout cellular regions in the wireless neighborhood, the cooperating eNBs comprising a subset of a plurality of eNBs in the wireless neighborhood, wherein the cellular regions are combined to form clusters, each cluster comprising a plurality of cellular regions, each cellular region being occupied by an eNB of the plurality of eNBs, the enhanced coordinated multi-point transmission further comprising:
calculating, by the UE, a path loss from each of a plurality of eNBs to the UE, resulting in a plurality of respective path loss calculations;
comparing, by the UE, the plurality of path loss calculations with a predefined threshold value; and
eliminating, by the UE, one or more of the plurality of eNBs, wherein the remaining eNBs comprise the cooperating eNBs; and
employing a portion of the frequency band for the wireless transmissions to and from the cooperating eNBs, wherein the portion is allocated using enhanced fractional frequency reuse, wherein the cluster is divided into a center region and a plurality of edge regions, the plurality of edge regions substantially corresponding to the edges of the plurality of cellular regions making up the cluster.

9. The method of claim 8, further comprising:
receiving, by the UE, reference signals from each of the cooperating eNBs in the cluster;
estimating, by the UE, a channel direction from the UE to each of the cooperating eNBs based on the reference signals received.

10. The method of claim 9, further comprising:
calculating, by the UE, a channel quality indicator (CQI) and pre-coding matrix indicator (PMI) corresponding to the cooperating eNBs; and
sending, by the UE, the calculated CQI and PMI to a home eNB of the cooperating eNBs.

11. The method of claim 8, employing a portion of the frequency band for the wireless transmissions to and from the cooperating eNBs further comprising:
receiving using a first frequency band, by the UE, wherein the UE is determined to be located in the center region of the cluster.

12. The method of claim 8, employing a portion of the frequency band for the wireless transmissions to and from the cooperating eNBs further comprising:
transmitting, by the UE to the cooperating eNBs using one of a plurality of smaller frequency bands, wherein the UE is determined to be located in one of the plurality of edge regions of the cluster.

13. An enhanced base station (eNB), comprising:
a processor;
a memory; and
a software program, wherein the software program is loaded into the memory and executed by the processor to perform the following operations:
receiving a plurality of path loss calculations, wherein the plurality of path loss calculations comprise path losses between a UE and a plurality of eNBs located in a wireless neighborhood; and
eliminating one or more of the plurality of eNBs whose path loss exceeds a predefined threshold value, wherein the uneliminated eNBs of the plurality of eNBs comprise cooperating eNBs.

14. The eNB of claim 13, wherein the software program further performs the following operations:
transmitting a reference signal to the UE, wherein the reference signal enables the UE to estimate its channel direction.

15. The eNB of claim 14, wherein the software program further performs the following operations:
receiving a channel quality indicator (CQI) and pre-coding matrix indicator (PMI) corresponding to each of the cooperating eNBs, wherein the CQI and PMI are calculated by the UE.

16. The eNB of claim 15, wherein the software program further performs the following operations:
sending the calculated CQI and PMI to a scheduler, wherein the scheduler is part of a backhaul connection between the plurality of eNBs, including the cooperating eNBs.

17. The eNB of claim 16, wherein the software program further performs the following operations:
receiving one or more beams formed by the scheduler, the one or more beams being sent through the backhaul to the cooperating eNBs, wherein the one or more beams are used by the UE for transmissions to respective cooperating eNBs.

18. The eNB of claim 17, wherein the software program further performs the following operations:
if the UE is located in the center region of the cluster;
then, using a first frequency band of the allocated frequency band for wireless transmissions to and from the UE;
otherwise, using one of a plurality of smaller frequency bands of the allocated frequency band for wireless transmissions to and from the UE.

* * * * *

UNITED STATES PATENT AND TRADEMARK OFFICE
CERTIFICATE OF CORRECTION

PATENT NO. : 8,768,393 B2  
APPLICATION NO. : 13/174392  
DATED : July 1, 2014  
INVENTOR(S) : Hooman Shirani-Mehr et al.

Page 1 of 1

It is certified that error appears in the above-identified patent and that said Letters Patent is hereby corrected as shown below:

On title page, in "Primary Examiner", in column 2, line 1, delete "Olumide T Ajibade Akona" and insert -- Olumide T Ajibade Akonai --, therefor.

Signed and Sealed this  
Seventh Day of October, 2014

Michelle K. Lee  
*Deputy Director of the United States Patent and Trademark Office*